United States Patent

Kamachi et al.

[15] 3,636,979
[45] Jan. 25, 1972

[54] HYDRAULIC VALVE

[72] Inventors: Shig K. Kamachi; Roy Lancaster, both of New Westminster, B.C., Canada

[73] Assignee: Queensboro Marine Equipment Ltd., New Westminster, British Columbia, Canada

[22] Filed: Nov. 24, 1969

[21] Appl. No.: 879,465

[52] U.S. Cl. .................................................... 137/625.23
[51] Int. Cl. ............................................................ F16k 11/02
[58] Field of Search ................. 137/625.21, 625.24, 625.23, 137/625.22; 251/208, 209

[56] References Cited

UNITED STATES PATENTS

| | | | |
|---|---|---|---|
| 630,124 | 8/1899 | Stage | 137/625.23 X |
| 1,949,875 | 3/1934 | Persoons et al. | 137/625.23 |
| 2,127,679 | 8/1938 | Dudley | 137/625.23 |
| 1,677,499 | 7/1928 | Smith | 137/625.23 |
| 2,700,984 | 2/1955 | Gleasman | 137/625.24 X |
| 3,096,788 | 7/1963 | Talbot et al. | 137/625.21 X |

*Primary Examiner*—M. Cary Nelson
*Assistant Examiner*—Robert J. Miller
*Attorney*—Lyle G. Trorey

[57] ABSTRACT

A valve for controlling flow of hydraulic fluid between a positive displacement pump and a reversible motor. A pair of relatively movable members, having mating surfaces in sliding sealed contact and having ports defining ends of fluid passages, movable into and out of registry, each relatively movable number provided with leads tapering away from the ports in a direction of relative movement of the surfaces, so metering fluid flow through the passages.

3 Claims, 4 Drawing Figures

PATENTED JAN 25 1972
3,636,979
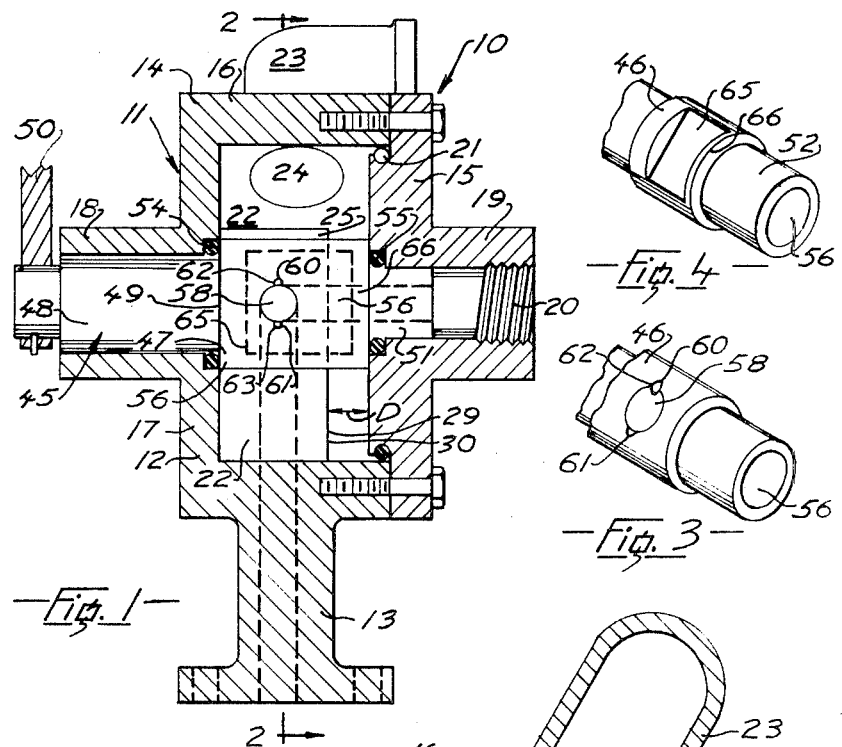
- Fig. 1 -
- Fig. 4 -
- Fig. 3 -
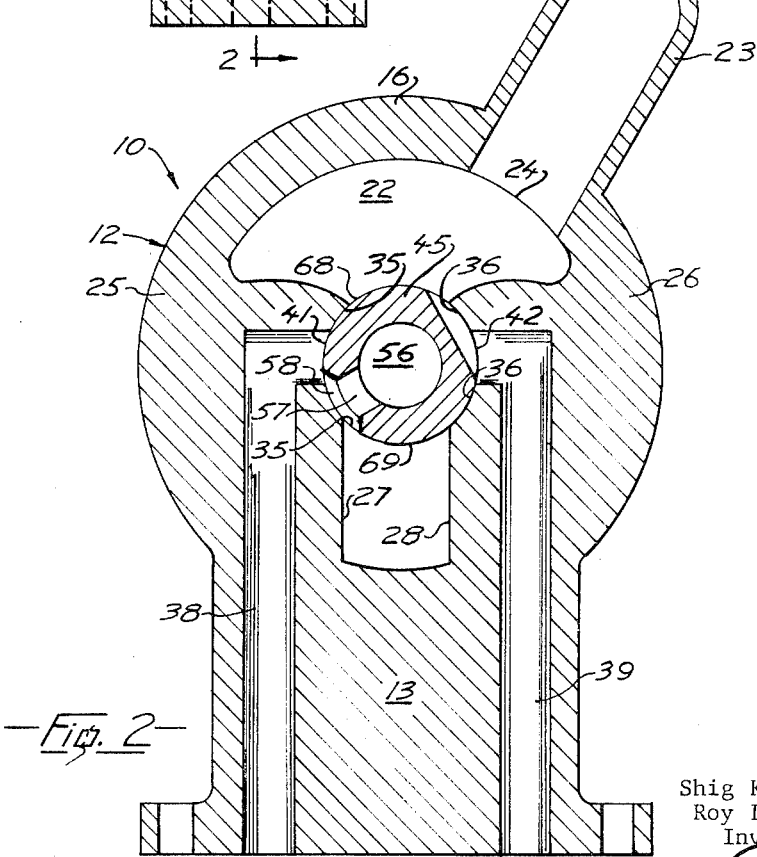
- Fig. 2 -
Shig K. Kamachi and
Roy Lancaster,
Inventors
by 
Lyle G. Trorey,
Agent

HYDRAULIC VALVE

BACKGROUND OF THE INVENTION

1. Field of the Invention

This invention relates to valves and in particular to valves for control of hydraulic fluid between positive displacement pumps and reversible hydraulic motors.

2. Prior Art

In operation of a hydraulic motor it is common practice to use a constant speed positive displacement pump. Flow control valves governing flow of hydraulic fluid to the motor should permit full flow of hydraulic fluid from the pump. It is important, since hydraulic fluid is incompressible, that the valves permit metering of the fluid to the motor, particularly when starting the latter.

Flow control valves of prior art usually have been of spool type having fluid control ports which are moved into and out of registry by an operating element which engages a threaded movable part so as to permit fine relative positioning of the ports and enable the ports to be moved slowly into registry so that the motor can be accelerated slowly from a stopped condition.

Spool-type control valves have not been entirely satisfactory as they are relatively costly and, due to their operation through a threaded connection between a pair of relatively movable components, require many turns of one of the components to achieve a desired fine fluid control.

SUMMARY OF THE INVENTION

The present invention provides a valve for controlling the flow of hydraulic fluid between a constant flow positive displacement pump and a reversible hydraulic motor, the valve permitting full forward and reverse flow to the motor. The flow is controlled by movement of a lever through a 180° range of arc, yet, within the range of movement of the operating lever, obtains fine fluid control so that the motor can be accelerated slowly and smoothly from a stopped condition to a full speed condition.

The valve of the present invention has only one moving component and is relatively inexpensive to manufacture yet is sufficiently rugged to withstand rough usage.

The valve of the present invention includes:
  a valve body having a valve chamber,
  an exhaust passage opening into the chamber for connecting the chamber to an intake side of the pump,
  a rotatable valve element extending through the valve body and chamber, the valve element having an inner cylindrical sealing surface,
  a blind bore opening out of one end of the valve element, the blind bore being adapted to receive hydraulic fluid from a discharge side of the pump,
  a transverse bore intersecting the blind bore and having a discharge port opening out of the inner sealing surface of the valve element for directing fluid into the chamber
  a longitudinally extending way formed in the sealing surface of the valve element spaced apart circumferentially from the discharge port,
  a pair of spaced-apart seat members in the chamber each seat member having a sealing face adapted to slideably and sealably contact the sealing surface of the valve element,
  a fluid passage extending into the valve body through each seat member, each fluid passage having a port opening out of a seat face and adapted to be connected to opposite sides of the motor, the ports of the fluid passages being disposed so that when either of them registers with the port of the transverse bore the other is in registry with the way
  circumferentially directed and diametrically opposed leads formed in the sealing surface of the valve element tapering away from the port in the sealing surface for metering fluid from the pump to the motor as the port in the sealing surface is moved into registry with either of the ports in the sealing faces of the seat member.

A detailed description following, related to the drawings, gives exemplification of preferred embodiment of the invention which, however, is capable of expression in structure other than that described and illustrated.

DESCRIPTION OF DRAWINGS

FIG. 1 is a central-sectional view of a valve of the invention,

FIG. 2 is an enlarged sectional view of the valve on line 2—2 of FIG. 1,

FIG. 3 is an isometric view of a portion of a valve element showing a port,

FIG. 4 is an isometric view of a portion of the valve element showing a way formed therein.

DETAILED DESCRIPTION

FIGS. 1 and 2

Referring to the drawings, and in particular to FIGS. 1 and 2, a valve of the invention is designated generally 10 and includes a valve body 11 having a generally cylindrical casing 12 and a base 13.

The casing 12 is of two part construction having a cylindrical cup-shaped portion 14 closed by a cover 15, bolted thereto. The cup-shaped portion has a cylindrical peripheral wall 16 and an annular end wall 17 having a centrally located exteriorly extending sleeve 18.

The cover 15 is also annular and has an exteriorly extending sleeve 19 axially aligned with the sleeve 18, the sleeve 19 having an interiorally threaded end 20. The cover is bolted to the peripheral wall 16, a fluid seal being effected by an O-ring 21. The cover and cup-shaped portion define a cylindrical chamber 22.

A fluid exhaust pipe 23 which is connected to an intake side of a positive displacement pump, not shown, is ported into the chamber 22 at 24, and the sleeve 19 is adapted to be connected to an exhaust side of the pump. A pair of seat members 25 and 26 extend inwards from the peripheral wall 16 into the chamber, the seat members having spaced-apart sidewalls 27 and 28, respectively, see FIG. 2, and having end walls 29 and 30, respectively, see FIG. 1, which are spaced apart from the cover a distance D. The seat members 25 and 26 have complementary sealing faces 35 and 36, respectively, of cylindrical shape which extend as portions of a surface of an imaginary cylinder axially aligned with the sleeves 18 and 19 and having a diameter greater than the inside diameters of both sleeves. As illustrated in FIGS. 1 and 2, the seat members, sleeves, cup-shaped portion of the casing, and the base, are cast as an integral unit.

Fluid passages 38 and 39 extend upwards through the base and the seat members and open into the chamber 22 through ports 41 and 42 opening centrally out of the sealing faces 35 and 36, respectively.

A valve element 45 is mounted for rotation in the casing 12. The valve element has an inner cylindrical portion 46 extending substantially from the end wall 17, and the cover 15 and has a cylindrical sealing surface 47 having a rotatable sealing fit with the sealing faces of the seat members. A cylindrical stem 48 extends from one end 49 of the cylindrical portion through the sleeve 18 and has an operating handle 50 nonrotatably secured thereto. A stub shaft 51 extends from an opposite end 52 of the portion 46 into, and has a rotatable fit in, the sleeve 19. O-rings 54 and 55 fit over the stem 48 and the stub shaft 51 for effecting a fluid seal between the valve element and the casing.

A blind axial bore 56 extends through the stub shaft 51 and is intersected by a transverse bore 57 which has a port 58 opening out of the sealing surface 47 of the cylindrical portion 46. The port 58 is the same size as the ports 41 and 42 and is located so that it can be moved into registry with either of the last mentioned ports.

FIG. 3

As illustrated particularly in FIG. 3, the cylindrical portion 46 is provided with a pair of short leads 60 and 61 formed in the sealing surface 47, extending circumferentially and in opposite directions away from the port 58. The leads 60 and 61 taper away from the port 58 to tips 62 and 63, respectively. The leads have a tip-to-tip circumferential measurement less than the circumferential length of the sealing faces 35 and 36 of the seat members.

FIG. 4

Referring particularly to FIG. 4, the cylindrical portion 46 is partially cut away, diametrically opposite to the transverse bore 57, to form a way 65 which extends just short of the end 52 of the portion 46 to form a lip 66 so as to provide a seating surface for the O-ring 55. The way 65 is located so as to be capable of registering with either of the ports 41 and 42 and has a transverse width less than the circumferential length of the sealing faces 35 and 36. The way, measured longitudinally of the valve element, has a length such that it extends outwards of the end walls 29 and 30 of the seat members, see FIG. 1. Unbroken sealing surfaces 68 and 69 extend between the way and the leads 60 and 61, each having a circumferential length sufficient to effect simultaneous closure of both ports 41 and 42, when the valve element is positioned so that the port 50 opens into the chamber.

OPERATION

In operation the valve is bolted to a reversible hydraulic motor, not shown, with the fluid passage 38 in communication with the other side of the motor. As has previously been explained and described, the valve is connected to an intake side of the pump via the pipe 23 and to the discharge side of the pump via the sleeve 18. With the valve element 45 positioned so that the unbroken sealing surfaces 68 and 69 cover the ports 41 and 42 the port 58 is disposed between the seat members 25 and 26 so that fluid from the intake side of the pump discharges into the chamber 22 and is returned to the intake side of the pump through the pipe 23. Fluid is locked in the fluid passages 38 and 39 to prevent fluid flow from either side of the motor. The motor, if it is of a positive displacement type, is therefore rendered immobile.

The valve element can be rotated 90° to provide full flow through the fluid passage 38 to one side of the motor through the fluid passage 39, the way 65 and the chamber 22 and back to the intake side of the pump through pipe 23. Fluid flow to and from the motor is reversed by simply rotating the operating handle 52 through 180° to place the port 58 in communication with fluid passage 39.

The leads 60 and 61 permit fine control and metering of fluid flow from the pump to the motor. As shown in FIG. 2, wherein the valve element is positioned so that the lead 60 is extended only partially across the port 41, an opening provided by the lead 60 is of small size so that the fluid flow into passage 38 is restricted providing only a small flow to the motor. As the valve element is rotated in a direction to bring the ports 58 and 41 into registry the tapered aspect of the lead 60 results in a gradual increase in size of the opening and a corresponding gradual increase in the gravity of fluid flow into the fluid passage 38. Lead 61 provides, in a like manner, fine control of initial discharge of fluid into fluid passage 39. It will be seen, therefore, that the valve of the present invention permits acceleration of the motor to full speed from a stopped condition in a smooth, controlled manner, and permits full flow of the pump at all times.

Furthermore, fluid flow from the pump is never stopped, as the circumferential lengths of the sealing faces of the seat member are correlated to the tip-to-tip measurement of the leads so that the sealing faces will not extend across and close the port 58 until the port 58 opens into either of the passages 38 or 39.

What I claim is:

1. A valve for controlling flow of hydraulic fluid between a positive displacement pump and a reversible motor the reversible motor having reversible intake and discharge sides including
   a. a valve body having a valve chamber,
   b. an exhaust passage opening into the chamber for connecting the chamber to an intake side of the pump,
   c. a rotatable valve element extending through the valve body and chamber, the valve element having an inner cylindrical sealing surface,
   d. a blind bore opening out of one end of the valve element and being adapted to receive hydraulic fluid from a discharge side of the pump,
   e. a transverse bore intersecting the bore and having a discharge port opening out of the inner sealing surface of the valve element for directing fluid into the chamber,
   f. a longitudinally extending way formed in the sealing surface of the valve element and being spaced-apart circumferentially from the discharge port.
   g. a pair of spaced-apart seat members in the chamber, each seat member having a sealing face adapted slideably and sealingly to contact the sealing surface of the valve element,
   h. a fluid passage extending through each seat member into the valve body, each fluid passage having a port opening out of a seat face and adapted to be connected to opposite sides of the motor, the ports of the fluid passages being disposed so that when either of them registers with the port of the transverse bore the other is in registry with the way,
   i. circumferentially directed and diametrically opposed leads formed in the sealing surface of the valve element the leads tapering away from the port in the sealing surface of the valve element for metering fluid from the pump to the motor as the port in the sealing surface is moved into registry with either of the ports in the sealing faces of the seat members.

2. A valve as claimed in claim 1 wherein the ports of the valve element and sealing faces of the seat member are disposed so that, when the valve element is rotated to move the transverse bore towards a position of registry with a port in any seat member, the transverse bore remains open and in communication with the chamber until the transverse bore communicates with the last-mentioned port so as to permit continuous fluid flow from the pump.

3. A valve as claimed in claim 1 in which unbroken sealing surfaces extend between the way and ports in the sealing surface, the sealing surfaces being adapted to close both ports of the seat members when the valve element is positioned to direct fluid flow from the transverse bore into the chamber.

* * * * *